(12) United States Patent
Dotan et al.

(10) Patent No.: US 8,639,481 B2
(45) Date of Patent: Jan. 28, 2014

(54) AUTOMATED INTERACTIVE MULTI-OBJECTIVE OPTIMIZATION-BASED SYSTEM DESIGN TOOL

(75) Inventors: Dolev Dotan, Bustan HaGalil (IL); Amit Fisher, Tavor, NJ (US); Michael Masin, Haifa (IL); Segev Wasserkrug, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 12/916,549

(22) Filed: Oct. 31, 2010

(65) Prior Publication Data

US 2012/0109606 A1    May 3, 2012

(51) Int. Cl.
G06F 7/60 (2006.01)
G06F 17/10 (2006.01)

(52) U.S. Cl.
USPC .................................................. 703/2; 703/1

(58) Field of Classification Search
USPC .......................................................... 703/1, 2
See application file for complete search history.

(56) References Cited

U.S. PATENT DOCUMENTS

| | | | |
|---|---|---|---|
| 6,086,617 A * | 7/2000 | Waldon et al. | 703/2 |
| 7,630,928 B2 | 12/2009 | Bonissone et al. | |
| 2007/0239497 A1* | 10/2007 | Fertig et al. | 705/7 |
| 2008/0168015 A1 | 7/2008 | Thie et al. | |
| 2008/0234994 A1* | 9/2008 | Goebel et al. | 703/7 |
| 2009/0132216 A1* | 5/2009 | Grichnik et al. | 703/2 |
| 2009/0326881 A1 | 12/2009 | Anai et al. | |

FOREIGN PATENT DOCUMENTS

| | | |
|---|---|---|
| CA | 2648669 | 1/2009 |
| EP | 1717735 | 4/2006 |

OTHER PUBLICATIONS

Stephen C. Skinner et al., "Development of a Methodology to Optimally Select Subsystems for Subsequent Integration into Helicopter Systems", Presented at the American Helicopter Society 64th Annual Forum, Montréal, Canada, Apr. 29-May 1, 2008.
Timo Aittokoski et al., "Cost Effective Simulation-Based Multiobjective Optimization in the Performance of an Internal Combustion Engine", 2008. URL:http://pdfserve.informaworld.com/77504_792740253.pdf.
Young-Jou Lai, "IMOST: Interactive Multiple Objective System Technique", 1995. URL:http://www.jstor.org/pss/3009907.
Amar Kishor et al., "Interactive Fuzzy Multiobjective Reliability Optimization Using NSGA-II", Paper accepted on Feb. 9, 2009. URL:http://www.springerlink.com/content/w85n364725375656/.

(Continued)

*Primary Examiner* — Dwin M Craig

(57) ABSTRACT

A method of interactively achieving a Pareto-optimal design of systems is provided herein. The method includes the following stages: generating a system model containing elements that are associated with design parameters and design alternatives, as well as directives for calculating the system's measures of effectiveness (being the optimization objectives); exploring a plurality of design configurations all satisfying specified system constraints, meeting a Pareto optimal condition over the objective space, and representing different areas of the design and objective spaces; presenting a user with the determined set of design configurations; allowing the user to choose a range of interest, and repeating the exploring and presenting stages, wherein in each repetition, the exploring is carried out within a smaller sub-range, until the user makes a final selection of a design configuration.

13 Claims, 3 Drawing Sheets

(56) References Cited

OTHER PUBLICATIONS

Benjamin Wilson et al., "Efficient Pareto Frontier Exploration Using Surrogate Approximations", 2000 by Timothy W. Simpson. Published by the American Institute of Aeronautics and Astronautics, Inc. URL:http://www.springerlink.com/content/12333231241x083j/.
Deb Kalyanmoy, "Multi-Objective Optimization Using Evolutionary Algorithms", 2001. URL: http://books.google.co.il/books?id=OSTn4GSy2uQC&printsec=frontcover&dq=Multi-Objective+Optimization+Using+Evolutionary+Algorithms&source=bl&ots=tCnvmtGqb5&sig=f09eezfvNYxx6_spfTWk7nQjczE&hl=iw&ei=_aW6TL73BpD84AbGsYXVDA&sa=X&oi=book_result&ct=result&resnum=1&ved=0CAYQ6AEwAA#v=onepage&q&f=false.
Michael Masin M. et al., "Diversity Maximization Approach for Multi-Objective Optimization", 2008.
Michael Masin M et al., "Design of self-regulating production control systems by Tradeoffs Programming", IIE Transactions, 37, 217-232. 2005.
"Advancing Traffic Efficiency and Safety through Software Technology phase 2 (ATESST2)", Overview of Analysis-Driven Architecture and Optimization Concepts in EAST-ADL, 2010. URL: http://www.atesst.org/home/liblocal/docs/ConceptPresentations/13_EAST-ADL_AnalysisandOptimizationConcepts.pdf.

* cited by examiner

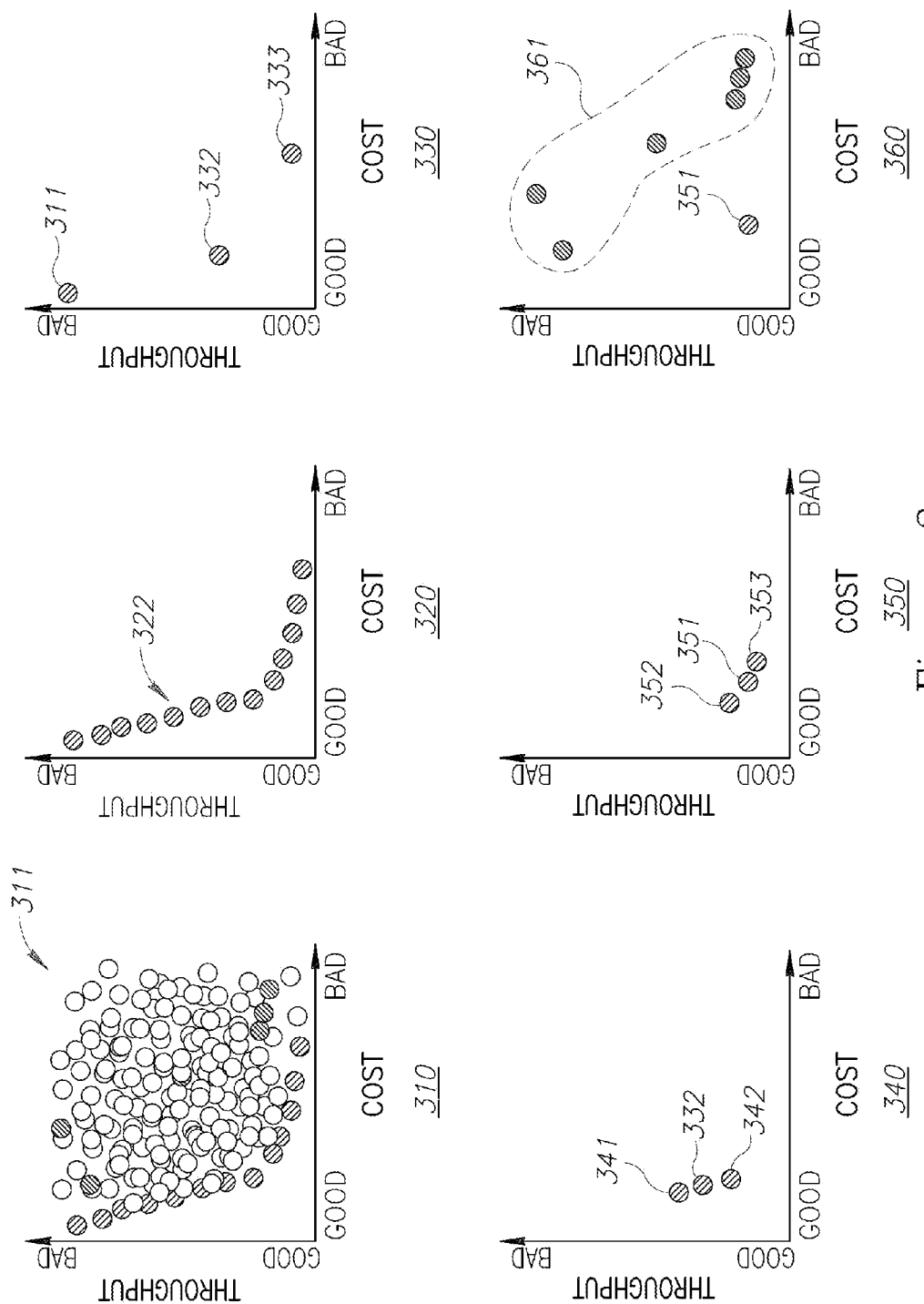

AUTOMATED INTERACTIVE MULTI-OBJECTIVE OPTIMIZATION-BASED SYSTEM DESIGN TOOL

BACKGROUND

1. Technical Field

The present invention relates to systems design and more particularly, to interactive optimization of systems design.

2. Discussion of the Related Art

Systems engineers are required to provide a design which balances conflicting objectives and, at the same time, satisfy multiple constraints and/or requirements. Examples of such objectives may be manufacturing and development costs, time-to-market, throughput, power consumption, usability and the like.

As Systems engineers consider many implementation aspects (such as hardware, software, and robotics), many design parameters may need to be explored in the process of reaching an optimal design. Non limiting examples of such design parameters may include: sensor sensitivity, engine efficiency, hardware/software partitioning, and optional features. Each possible design may be defined as a configuration (or combination) of design parameter values. The systems engineer needs to find the best design configuration—the one which optimizes the objectives described above.

Existing design workflows include a process called a "trade study". In this process, different configurations are considered. For each such configuration the systems engineer needs to calculate the different "Measures of Effectiveness" (MoE), i.e., objectives from above, using appropriate techniques. For example, for calculating the cost a simple sum of the cost of the parts and the integration costs may be used. For calculating power consumption, simulations of the systems in different usage scenarios may be needed. After these calculations, the measures of effectiveness are often normalized and combined to a single value using a weighted average, and the best configuration (the one with the highest result) is chosen.

The existing approach suffers from several drawbacks as follows: the user has to explicitly enumerate the different configurations, and then manually perform the calculations—manually changing the simulation models if needed. This is a time-consuming and error-prone process. Further, the user may not even consider the best options. In addition, from a practical point of view, some of the design parameters are continuous values, with an infinite design space. Often, it is better to examine the different objectives and consider their trade-offs consciously, rather than relying on a weighted average which is used in many design optimization processes.

BRIEF SUMMARY

Embodiments of the present invention overcome the aforementioned drawbacks of the existing art and combine the capabilities of model-based systems engineering, variability modeling and instance derivation, simulation execution, multi-objective optimization and visualization.

One aspect of the invention provides a method of interactively achieving a Pareto optimal design of systems. The method includes the following stages: modeling a system to yield a system model containing elements, wherein the elements are associated with design parameters and design alternatives; exploring a plurality of design configurations by assigning specified values to the design parameters and selecting design alternatives, such that the design configurations meet specified system requirements and design goals over specified constraints; determining, based on the system model and the explored design configurations, a set of design configurations, all meeting a Pareto optimal condition over a design configurations space; presenting a user with a subset of design configurations selected from the determined set of design configurations; and repeating the presenting the user, wherein in each repetition, a different subset of design configurations all located within a specified range from a repeatedly user-selected design configuration, until the user makes a final selection of a design configuration.

Other aspects of the invention may include a system arranged to execute the aforementioned method and a computer readable program configured to execute the aforementioned method. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout. In the accompanying drawings:

FIG. 3 shows several graphical representations of the optimization process according to some embodiments of the invention.

Figure 1:
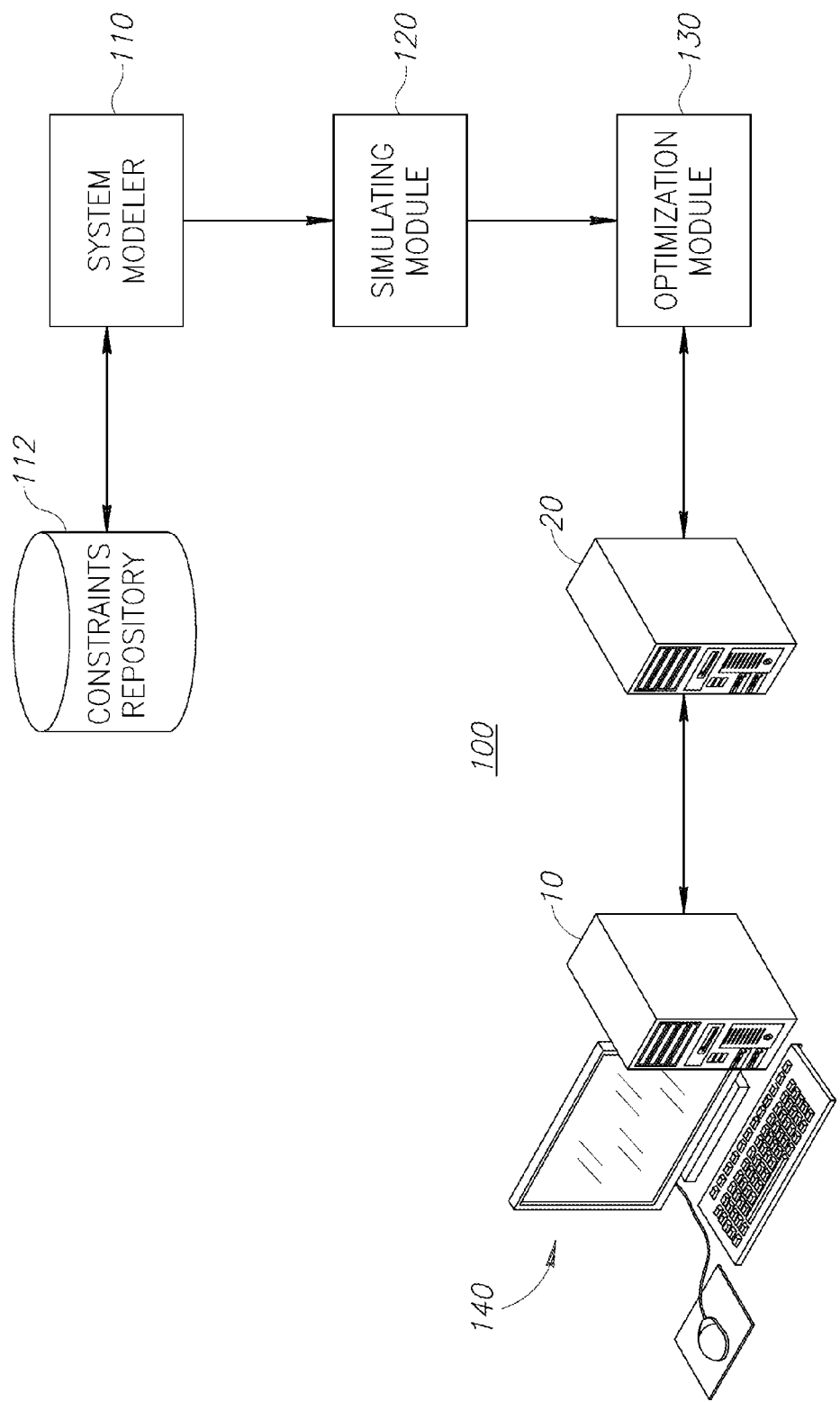
FIG. 1 is a high level schematic block diagram illustrating the system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "Pareto efficiency" or "Pareto optimality" as used herein in this application refers to situations in which it is impossible to make improvement in one parameter without necessarily making it worse in another parameter terms. Given a set of choices and a way of valuing them, the Pareto frontier or Pareto set is the set of choices that are Pareto efficient. In system design, by restricting attention to the set of choices that are Pareto-efficient, a designer can make tradeoffs within this set, rather than considering the full range of every parameter.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram illustrating an exemplary environment of a system 100 according to some embodiments of the invention. System 100 may include a server 20 connected to a terminal 10 configured with a specified graphical user interface (GUI) 140 over a communication network. Server 20 may be further in operative association with optimization module 130, simulating module 120, system modeler 110, and constraints repository 112. Although system 100 is illustrated in a client-server configuration, it is understood that the aforementioned configuration is for illustration purposes only and other architectures may be used in order to implement system 100.

The operation of system 100 includes two main phases. On a first phase, a model for the system is designed by system modeler 110 based on constraints stored on constraints repository 112. The model includes the system's architecture and high-level behavior (which may include enough details for a simulation). The model further includes the design parameters and different structural and behavioral alternatives. The design also includes optimization data and measures of effectiveness (MoE) calculation formulas. Finally, the design includes scripts for executing the simulation model and calculating MoEs. The model is then being simulated by simulating module 120 to yield potential design configuration that are comparable over a common MoE space.

On the second phase, an efficient search for optimal design configurations is performed using optimization module 130 and over GUI 140. The search is performed using the aforementioned system model as a source for calculating measures of effectiveness for given design configurations. The search phase further employs multi-objective optimization algorithms to efficiently find out the Pareto-optimal designs. Then, over GUI 140, results are visualized and the user participates in an interactive search, allowing fine-tuning leading to interesting and relevant parts of the objective space.

Figure 2:
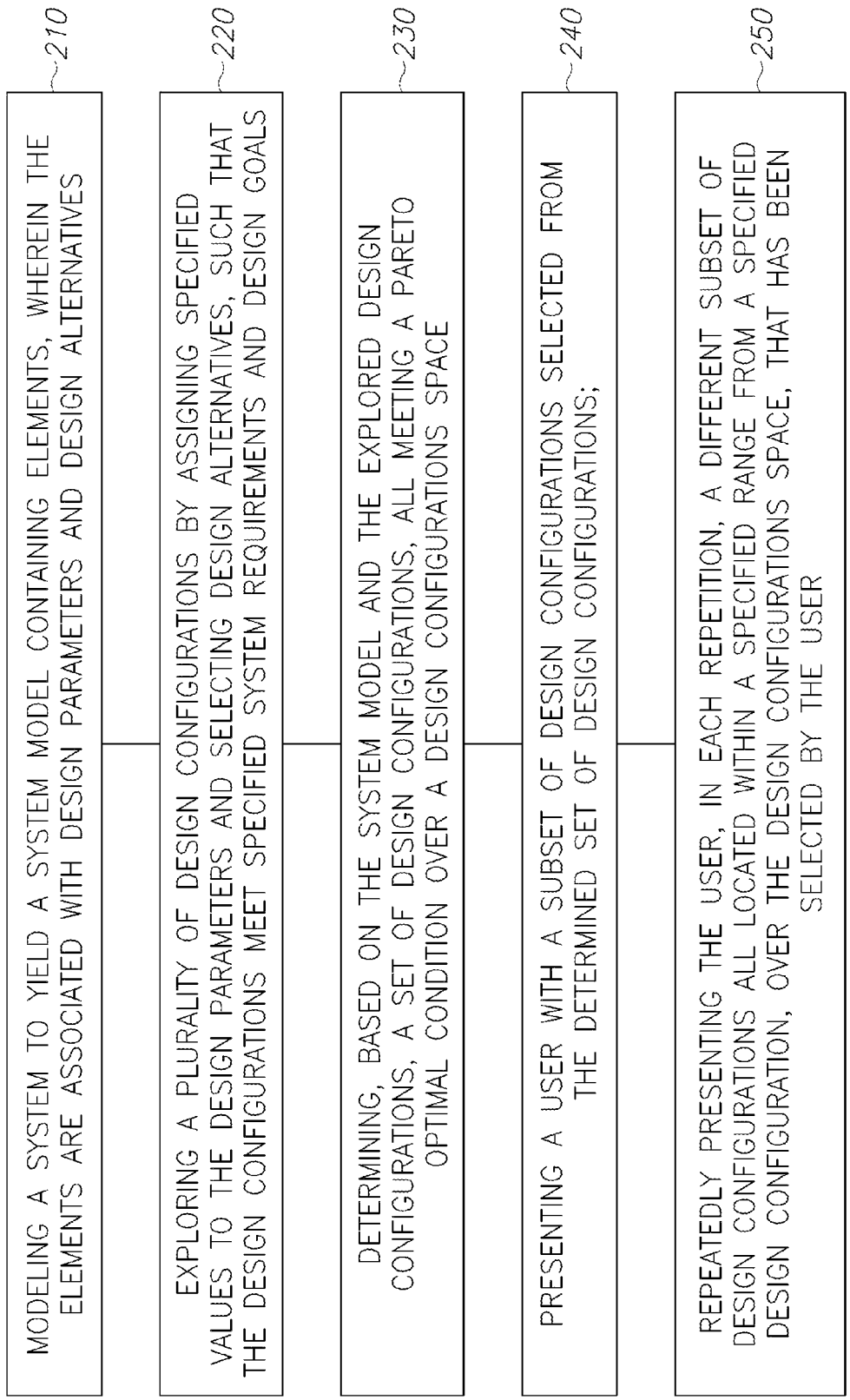
FIG. 2 is a high level flowchart diagram illustrating a method according to some embodiments of the invention.

FIG. 2 is a high level flowchart diagram illustrating a method according to some embodiments of the invention. Method 200 may include the following stages: modeling a system to yield a system model containing elements, wherein the elements are associated with design parameters and design alternatives 210; exploring a plurality of design configurations by assigning specified values to the design parameters and selecting design alternatives, such that the design configurations meet specified system requirements and design goals over specified constraints 220; determining, based on the system model and the explored design configurations, a set of design configurations, all meeting a Pareto optimal condition over a design configurations space 230; presenting a user with a subset of design configurations selected from the determined set of design configurations 240; and repeating the presenting, wherein in each repetition, a different subset of design configurations all located within a specified range from a repeatedly user-selected design configuration, over the design configurations space, until the user makes a final selection of a design configuration 250.

Consistent with some embodiments of the invention, in the modeling stage 210 the system model is augmented by a modeler. The system's architecture and high-level behavior are designed using an existing modeling language such as UML or SysML and the like. In these languages, architecture is described using structure and class diagrams and behavior may be described using state machines and activity diagrams. Often, users will utilize existing capabilities of the modeling tools to integrate with models of subsystems written in other languages and tools such as Simulink.

In addition, methods and tool support from the field of software product line modeling may be used for modeling design parameters and alternatives. Specifically, the design parameters are explicitly modeled as elements in the architecture model mentioned above or in an associated variability model. These elements have a type, which may be: Boolean—representing optional features; Enumeration—with the different literals representing different variants; and Numeric—representing numerical parameters.

On top of the design parameters, the different alternatives are explicitly modeled. For example, if there are different implementation options for a specific part, these alternative implementations are modeled and specified as variants. Each variant is assigned a selection condition above the design parameters. At a later stage, when a design configuration is given, the tool will use these conditions for deriving the corresponding model which will have no variation and thus may be executable.

The Following is a non limiting example of some of the constructs for variability modeling which may be used: Optional model elements; Alternative model elements; Surrogate model elements—a model element which is replaced by variants; Assignment from design parameter value—e.g., for inserting different possible numerical values to constants, inputs, and the like; and Selection constraints—which state that the selection of one model element mandates the selection of another or excludes it.

Consistent with some embodiments of the invention, the modeling stage 210 may further address optimization data and Measures of Effectiveness (MoEs). Elements in the model may be tagged with data that is used for optimization, such as: production cost of a part, throughput of a communications channel (connector in the model), duration of a transition in a state machine, and so on. These different tags may be defined by the user or may be taken from a specific UML profile, such as the MARTE profile in the case of time durations. In the latter case, the modeling tool may use this information in the simulation.

The different MoEs (cost, performance, throughput, time-to-market, and the like) are explicitly modeled as model elements. At a later stage, the tool will use these to store the values calculated for a given configuration. These values are calculated either: (i) Statically, by evaluating formulas that specify how their values are derived from the optimization data (e.g., SysML Parametric Diagrams may be used for this purpose); or: (ii) Dynamically, by incorporating results from the simulations.

In the exploring stage 220 simulation scripts may be used to specify the scenarios which will drive the simulation of the system model. These scripts are specified using: Sequence diagrams; Activity diagrams; Code snippets; Special simulation-specific directives may be used for: Repeating simulations; arithmetic and normalization; and collecting probabilistic MoEs and calculating statistic measures on them.

During the determining stage 230 an optimization process is carried out. The system model and simulations are used as an information source for calculating MoEs for different design configurations. As explained before, given a configuration of values for the design parameters, the optimization module 130 may filter-out unchosen variants from the system model, and inject values of design parameters where needed. This process (sometimes called materialization, actuation, instantiation, or product derivation) results in a model that corresponds with the given configuration. Using this model, the tool calculates the MoEs by evaluating the formulas of static MoEs and by executing the simulations for calculating dynamic MoEs. Optimization module 130 ensures that only valid configurations are chosen. If the resulting design violates any constraint described in the model, the oracle will notify the optimization process instead of evaluating the MoEs.

FIG. 3 shows several exemplary screenshots illustrating the graphical interactive optimization process according to some embodiments of the invention. Graph 310 shows the entire valid designs. In 320 the whole Pareto frontier is shown. In graph 330 the tool finds a small subset of Pareto optimal designs (usually something like 3 to 10, which is a manageable number, being two or sometimes more orders of magnitude below all possible design configurations) that represent the whole efficient frontier, and show them in graphical and table forms to the Systems Engineer. The Systems Engineer may manually fine-tune the suggested designs and chooses the most attractive design among all alternatives. If the Systems Engineer is satisfied with this design, the optimization process stops. Otherwise, a small subset of Pareto optimal designs that represent the whole efficient frontier in a pre-defined neighborhood of the previously chosen design in calculated and presented to the Systems Engineer in graph 340. The system engineer may either select the design or else is presented with another small subset of neighboring designs for a different design on the Parent frontier in graph 350. The final selection 351, as shown in graph 360 is far better than design optimization achieved by manual tradeoff study 361.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A computerized method of interactively providing a multi-objective optimal design, comprising:
   modeling, using a computerized processor, a system to yield a high level system design model containing a plurality of elements, wherein the plurality of elements are associated with a plurality of design parameters and a plurality of design alternatives, the association of the plurality of elements with the plurality of design parameters is done through a variability model;
   modeling the variability of the high level system design model by assigning variability data to the plurality of elements, the variability data includes at least one of optional element designation and alternative element designation, wherein the assigning is based on the variability characteristics of the plurality of elements;
   exploring a plurality of design configurations by assigning specified values to the design parameters and thus selecting design alternatives, such that the design configurations meet specified system requirements and design goals over specified constraints and calculating at least one measure of effectiveness (MoEs) for each one of the plurality of design alternatives;
   determining, based on the system model and the calculated at least one MoEs for the plurality of design configurations, a set of design configurations, all meeting a Pareto optimal condition over an MoEs space;
   interactively selecting a preferred design configuration by presenting a user with a subset of design configurations from the determined set of Pareto optimal design configurations, along with their respective calculated at least one MoEs, and designating a preferred design configuration selected by the user; and
   repeating the presenting, wherein in each repetition, a different subset consisting of alternative Pareto optimal design configurations located in the MoEs space within a specified range from the at least one MoEs of the preferred design configuration selected in the previous repetition, until the user makes a final selection of the preferred design configuration.

2. The method according to claim 1, wherein in the exploring, the calculating the at least MoEs is carried out at least partially by simulation.

3. The method according to claim 1, wherein the subset of design configurations comprises Pareto optimal design configurations being two or more orders of magnitude below the other design configurations among the explored plurality of design configurations.

4. The method according to claim 1, wherein the presenting is carried out graphically to allow the user to select the preferred design configuration.

5. The method according to claim 1, further comprising calculating at least one design score for each selected design configuration and presenting the calculated score to the user, such that the score is useable for basing the design configuration selection thereon.

6. A system for interactively providing a multi-objective optimal design, comprising:
   a computerized processor;
   a system modeler configured to model a system to yield a high level system design model containing a plurality of elements, wherein the plurality of elements are associated with a plurality of design parameters and a plurality of design alternatives, the plurality of elements are associated with the plurality of design parameters through variability modeling;
   a computing module configured to explore a plurality of design configurations by assigning specified values to the design parameters and thus selecting design alternatives, such that the design configurations meet specified system requirements and design goals over specified constraints, and calculates at least one measures of effectiveness (MoEs) for each one of the plurality of design configuration, the computing module performs variability modeling to assign variability data to the plurality of elements, the variability data includes at least one of optional element designation and alternative element designation, wherein the assigning is based on the variability characteristics of the plurality of elements;
   an optimization module configured to determine, based on the system model and the calculated at least one MoEs for the explored plurality of design configurations, a set of design configurations, all meeting a Pareto optimal condition over an MoEs-space;
   and
   a Graphical User Interface (GUI) configured to: (i) interactively select a preferred design configuration by presenting a user with a subset of design configurations selected from the determined set of Pareto optimal design configurations, along with their respective calculated at least one MoEs, and designating a preferred design configuration by the user; and (ii) repeatedly present the user, in each repetition, a different subset consisting of alternative Pareto optimal design configurations located within a specified range in the MoE-space from the at least one MoEs of the preferred design configuration selected in the previous repetition, until the user makes a final selection of the preferred design configuration;
   wherein the system modeler, the computing module, the optimization module and the Graphical User Interface are executed by the computerized processor.

7. The system according to claim 6, wherein the computing unit comprises a simulating module configured to perform the calculating of the at least one MoEs at least partially by simulation.

8. The system according to claim 6, wherein the subset of design configurations comprises Pareto optimal design configurations being two or more orders of magnitude below other design configurations among the explored plurality of design configurations.

9. The system according to claim 6, further comprising a scoring unit configured to calculate at least one design score for each selected design configuration and presenting the calculated score to the user, such that the score is useable for basing the design configuration selection thereon.

10. A computer program product for interactively providing a multi-objective optimal design, the computer program product comprising:
    a non-transitory computer readable medium encoded with computer readable program instructions which, when executed by at least one computerized processor, cause the at least one computerized processor to perform operations, comprising:
    computer readable program configured to model a system to yield a high level system design model containing a plurality of elements, wherein the plurality of elements are associated with a plurality of design parameters and a plurality of design alternatives, the association of the plurality of elements with the plurality of design parameters is done through a variability model;
    computer readable program configured to explore a plurality of design configurations by assigning specified values to the design parameters and thus selecting design alternatives, such that the design configurations meet specified system requirements and design goals over specified constraints, and calculating at least one measure of effectiveness (MoEs) for each one of the plurality of design alternatives;
    computer readable program configured to determine, based on the system model and the calculated at least one MoEs for the explored plurality of design configurations, a set of design configurations, all meeting a Pareto optimal condition over an MoEs;
    computer readable program configured to model variability of the plurality of elements by assigning each one of the plurality of elements with at least one of optional element designation and alternative element designation, wherein the assigning is based on the variability characteristics of the plurality of elements; and
    computer readable program configured to: (i) interactively select a preferred design configuration by presenting a user with a subset of design configurations selected from the determined set of Pareto optimal design configurations, along with their calculated at least one MoEs, and designating a preferred design configuration by the user; and (ii) repeatedly present the user, in each repetition, a different subset consisting of alternative Pareto optimal design configurations located in the MoEs space within a specified range from the calculated at least one MoEs of the preferred design configuration selected in the previous repetition, until the user makes a final selection of the preferred design configuration.

11. The computer program product according to claim 10, further comprising computer readable program configured to perform the calculating of the at least one MoEs at least partially by simulation.

12. The computer program product according to claim 10, wherein the subset of design configurations comprises Pareto optimal design configurations being two or more orders of magnitude below other design configurations among the explored plurality of design configurations.

13. The computer program product according to claim 10, further comprising computer readable program configured to calculate at least one design score for each selected design configuration and presenting the calculated score to the user, such that the score is useable for basing the design configuration selection thereon.

\* \* \* \* \*